United States Patent
Ruiz

(10) Patent No.: US 7,021,281 B2
(45) Date of Patent: Apr. 4, 2006

(54) ENGINE IDLE CONTROL SYSTEM

(75) Inventor: Victoriano Ruiz, Brighton, MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 10/891,469

(22) Filed: Jul. 14, 2004

(65) Prior Publication Data

US 2006/0011166 A1    Jan. 19, 2006

(51) Int. Cl.
*F02D 41/08* (2006.01)

(52) U.S. Cl. .................. 123/339.19; 123/339.11; 123/348; 123/90.15

(58) Field of Classification Search .. 123/90.15–90.18, 123/339.1, 339.14, 339.19, 345–348
See application file for complete search history.

(56) References Cited

U.S. PATENT DOCUMENTS

| | | | | |
|---|---|---|---|---|
| 5,115,782 A | * | 5/1992 | Klinke et al. | 123/90.11 |
| 5,529,031 A | * | 6/1996 | Yoshioka | 123/90.15 |
| 5,765,528 A | * | 6/1998 | Kamimaru | 123/339.14 |
| 6,513,490 B1 | * | 2/2003 | Kawasaki et al. | 123/339.16 |
| 6,516,777 B1 | * | 2/2003 | Yano | 123/348 |
| 6,651,619 B1 | * | 11/2003 | Ogiso | 123/339.19 |

* cited by examiner

*Primary Examiner*—Erick Solis
(74) *Attorney, Agent, or Firm*—Christopher DeVries

(57) ABSTRACT

An internal combustion engine idle speed control system includes a first valve control mechanism that adjusts a first operating parameter of a first cylinder valve. A control module determines an idle speed error and generates a first control signal to the first valve control mechanism to adjust the first operating parameter. The first control signal is based on the idle speed error.

24 Claims, 2 Drawing Sheets

ENGINE IDLE CONTROL SYSTEM

FIELD OF THE INVENTION

The present invention relates to internal combustion engines, and more particularly to an engine idle control system.

BACKGROUND OF THE INVENTION

Internal combustion engines are controlled during idle by an electronic throttle control valve or blade that is relatively large and incapable of making small adjustments to the intake airflow. As such, throttle valves do not adequately control idle speed. To address this limitation, a separate idle air control valve has been used to define smaller adjustments to the intake airflow and therefore the engine idle speed.

Other control systems use spark timing to adjust engine idle speed. By advancing or retarding spark timing the torque output and engine speed are adjusted. The spark timing is usually adjusted to achieve the mean best torque (MBT). As such, advancing and retarding of the spark from the MBT reduces engine performance and increases fuel consumption.

SUMMARY OF THE INVENTION

Accordingly, the present invention provides an internal combustion engine idle speed control system. The engine idle speed control system includes a first valve control mechanism that adjusts a first operating parameter of a first cylinder valve. A control module determines an idle speed error and generates a first control signal to the first valve control mechanism to adjust the first operating parameter. The first control signal is based on the idle speed error.

In one feature, the first cylinder valve is an intake valve.

In other features, the first valve control mechanism is a cam shaft phaser that adjusts a timing of the first cylinder valve. The cam shaft phaser advances the timing to reduce the idle speed error. Alternatively, the cam shaft phaser retards the timing to reduce the idle speed error.

In another feature, the first valve control mechanism adjusts a lift of the first cylinder valve to reduce the idle speed error.

In other features, the system further includes a second valve control mechanism that adjusts a second operating parameter of a second cylinder valve. The control module generates a second control signal to the second valve control mechanism to adjust the second operating parameter. The second control signal is based on the idle speed error.

In still other features, the second cylinder valve is an exhaust valve. The second valve control mechanism is a cam shaft phaser that adjusts a timing of the second cylinder valve. The cam shaft phaser advances the timing to reduce the idle speed error. Alternatively, the cam shaft phaser retards the timing to reduce the idle speed error.

In another feature, the second valve control mechanism adjusts a lift of the second cylinder valve to reduce the idle speed error.

In another feature, the control module determines the idle speed error as a difference between a target idle speed and an actual idle speed.

In still another feature, the system further includes a spark plug. The control module adjusts a spark timing of the spark plug to reduce the idle speed error.

In yet another feature, the system further includes a throttle. The control module adjusts a position of the throttle to reduce the idle speed error.

Further aspects and features will become apparent from the detailed description provided hereinafter. It should be understood that the detailed description and specific examples, while indicating one or more preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings.

DETAILED DESCRIPTION

Figure 1:
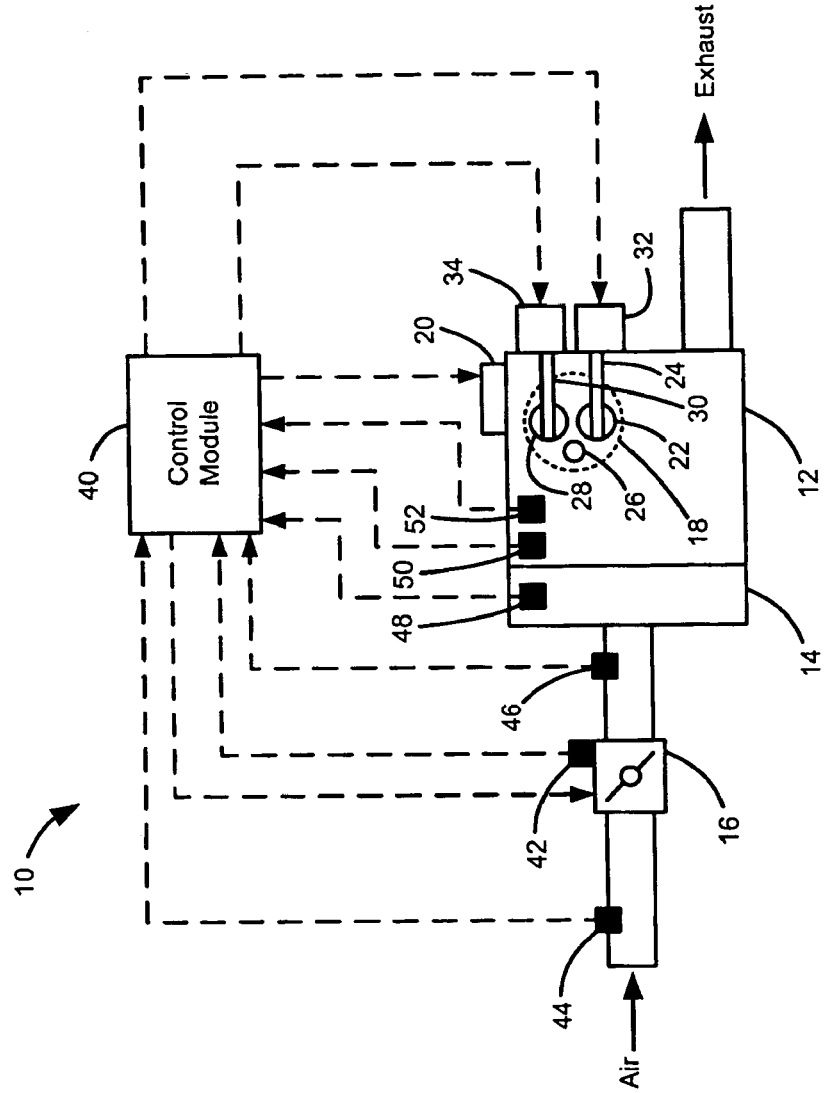
FIG. 1 is a functional block diagram of an engine system including an engine idle control system according to the present invention.

The following description of the embodiments is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an engine system 10 includes an engine 12 that combusts an air and fuel mixture to produce drive torque. Air is drawn into an intake manifold 14 through a throttle 16. The throttle 16 regulates mass air flow into the intake manifold 14. Air within the intake manifold 14 is distributed into cylinders 18. Although a single cylinder 18 is illustrated, it is appreciated that the engine idle control system of the present invention can be implemented in engines having a plurality of cylinders including, but not limited to, 2, 3, 4, 5, 6, 8, 10 and 12 cylinders.

A fuel injector (not shown) injects fuel which is combined with the air as it is drawn into the cylinder 18 through an intake port. The fuel injector may be an injector associated with an electronic or mechanical fuel injection system 20, a jet or port of a carburetor or another system for mixing fuel with intake air. The fuel injector is controlled to provide a desired air-to-fuel (A/F) ratio within each cylinder 18.

An intake valve 22 selectively opens and closes to enable the air/fuel mixture to enter the cylinder 18. The intake valve position is regulated by an intake cam shaft 24. A piston (not shown) compresses the air/fuel mixture within the cylinder 18. A spark plug 26 initiates combustion of the air/fuel mixture, driving the piston in the cylinder 18. The piston drives a crankshaft (not shown) to produce drive torque. Combustion exhaust within the cylinder 18 is forced out an exhaust port when an exhaust valve 28 is in an open position. The exhaust valve position is regulated by an exhaust cam shaft 30. The exhaust is treated in an exhaust system and is released to atmosphere. Although single intake and exhaust valves 22,28 are illustrated, it is appreciated that the engine 12 can include multiple intake and exhaust valves 22,28 per cylinder 18.

The engine system 10 further includes an intake cam phaser 32 and an exhaust cam phaser 34 that respectively regulate the rotational timing and/or lift of the intake and exhaust cam shafts 24,30. More specifically, the timing of the intake and exhaust cam shafts 24,30 can be retarded or advanced with respect to each other or with respect to a location of the piston within the cylinder 18 or crankshaft position. In this manner, the position of the intake and exhaust valves 22,28 can be regulated with respect to each other or with respect to a location of the piston within the cylinder 18. By regulating the position of the intake valve 22 and the exhaust valve 28, the quantity of air/fuel mixture ingested into the cylinder 18 can be regulated. Additionally, the quantity of exhaust vented through the exhaust valve 28 can be regulated.

A control module 40 operates the engine based on the engine idle control of the present invention. The control module 40 can control the entire engine system 10 or can include sub-modules that control different aspects of the engine system 10 including, but not limited to, an idle control module, a fuel injection sub-module, an intake camshaft phaser sub-module, an exhaust camshaft phaser sub-module and a dynamic spark control (DSC) sub-module. The control module 40 or sub-modules generate control signals to regulate engine components in response to engine operating conditions.

The control module 40 generates a throttle control signal based on a position of an accelerator pedal (not shown) and a throttle position signal generated by a throttle position sensor (TPS) 42. A throttle actuator adjusts the throttle position based on the throttle control signal. The throttle actuator can include a motor or a stepper motor, which provides limited and/or coarse control of the throttle position. The control module 40 also regulates the fuel injection system 20 and the cam shaft phasers 32,34, as discussed in further detail below.

An intake air temperature (IAT) sensor 44 is responsive to a temperature of the intake air flow and generates an intake air temperature signal. A mass airflow (MAF) sensor 46 is responsive to the mass of the intake air flow and generates a MAF signal. A manifold absolute pressure (MAP) sensor 48 is responsive to the pressure within the intake manifold 14 and generates a MAP signal. An engine coolant temperature sensor 50 is responsive to a coolant temperature and generates an engine temperature signal. An engine speed sensor 52 is responsive to a rotational speed of the engine 102 and generates in an engine speed signal. Each of the signals generated by the sensors are received by the control module 40.

When implementing DSC, the control module 40 controls the timing and/or energy of the spark plug ignition. The timing may be advanced or retarded relative to the position of piston within the cylinder 18 and relative to the positions of the intake valve 22 and/or the exhaust valve 28. Varying the timing of the spark adjusts the engine speed.

It is appreciated that the engine system 10 is merely exemplary in nature. It is anticipated that the engine idle control system of the present invention can be implemented with alternative engine systems. For example, the engine idle control system of the present invention can control engine systems that include a turbocharger or supercharger, which regulates pressurized air flow into the intake manifold. Similarly, the engine idle control system of the present invention can control engine systems that include an idle air control (IAC) valve that regulates air flow into the intake manifold, bypassing the throttle.

In operation, the control module 40 receives the various signals and determines whether the engine 12 is to operate at idle. For example, the control module 40 may determine that when the throttle 16 is in a neutral or an idle position and the engine speed has decreased to at or near a desired engine idle speed (e.g., 800 RPM), the engine 12 is to operate at idle. While at idle, the control module 40 generates engine control signals to operate the engine 12 at a predetermined or target engine idle speed ($N_{TARGET}$). The target engine idle speed may be established based on a variety of factors such as, but not limited to, desired operating torque for future acceleration, engine efficiency, fuel efficiency and/or emissions. While the target engine idle speed varies based on engine type, typical target engine idle speeds range between 500 RPM and 1200 RPM. The control module 40 determines the actual engine idle speed ($N_{ACT}$) based on the engine speed signal. The control module 40 determines an idle speed error ($N_{ERROR}$) as the difference between $N_{ACT}$ and $N_{TARGET}$.

The control module 40 generates one or more control signals to adjust the engine speed in an effort to minimize $N_{ERROR}$. The control module 40 can regulate the throttle 16 to a predetermined idle position ($P_{IDLE}$). Moving to $P_{IDLE}$, however, provides coarse control of air flow into the intake manifold 14. As a result, $N_{ACT}$ can overshoot/undershoot $N_{TARGET}$ by up to several hundred RPM. As such, the control module 40 controls or adjusts intake air flow by controlling one or more valves 22,28.

To achieve finer idle speed control, the control module 40 regulates the timing and/or lift of one or both the intake valve 22 and/or the exhaust valve 28. The valve controlled intake air flow may be defined as a function of the cam phase difference, which is the difference between the cam phase of the intake valve 22 and the exhaust valve 28. Control of the intake valve 22 and the exhaust valve 28 timing and/or lift is a function of $N_{ERROR}$. The control mechanism can vary based on whether the $N_{ERROR}$ is positive (i.e., $N_{ACT} > N_{TARGET}$) or negative (i.e., $N_{ACT} < N_{TARGET}$). If $N_{ERROR}$ is negative, the cam phase difference is increased by the control module 40. Such an increase in cam phase difference results from advancing the timing of the intake valve 22, retarding the timing of the exhaust valve 28 or both. Increasing the cam phase difference by any of these valve timing methods increases the fuel ingested into cylinder 18 and increases the engine torque and engine speed. Under closed loop control, $N_{ACT}$ is increased to reduce $N_{ERROR}$ over one or more engine cycles until $N_{ERROR}$ approaches or is equal to zero.

Similarly, the control module 40 may increase the lift or increase the duration of the opening of the intake valve 22 to increase the intake airflow into cylinder 18, thereby increasing $N_{ACT}$. In addition or in the alternative, a lift or duration of the opening of the exhaust valve 28 may be used to increase the intake airflow into cylinder 18. This enables more exhaust to be exhausted from the cylinder 18, thereby enabling an increase in the quantity of air/fuel ingested into the cylinder 18 during the next opening of intake valve 22. As a result, $N_{ACT}$ is increased. Similar adjustments to $N_{ACT}$ are achieved by delaying and expanding the duration of time that the intake valve 22 and/or exhaust valve 28 are open during each combustion cycle.

If $N_{ERROR}$ is negative, the cam phase difference is decreased by the control module 40. Such a decrease in cam phase difference can be achieved by retarding the timing of the intake valve 22, advancing the timing of the exhaust valve 28, or both. Decreasing the cam phase difference between intake valve 22 and exhaust valve 28 decreases the fuel ingested into cylinder 18 thereby decreasing $N_{ACT}$. Under closed loop control, the control module 40 decreases $N_{ACT}$ to reduce $N_{ERROR}$ over one or more engine cycles until $N_{ERROR}$ approaches or is equal to zero.

The control module 40 may decrease the lift or decrease the duration of the opening of the intake valve 22 to decrease the intake air flow into cylinder 18. Reducing the lift of the intake valve 22 reduces the fuel ingested into cylinder 18, thereby reducing $N_{ACT}$. Additionally, decreasing the lift of the exhaust valve 28 retains more exhaust gas in cylinder 18 thereby limiting the quantity of new gas allowed in cylinder 18 at the next opening of intake valve 22. As a result, $N_{ACT}$ is reduced.

In addition to controlling the intake valve 22 and/or the exhaust valve 28, the control module can more finely adjust $N_{ACT}$ using DSC. $N_{ACT}$ is adjusted by advancing and retarding the timing of the spark relative to the position of the piston within the cylinder 18. In general, the spark timing is adjusted from the minimum spark advance to achieve the best torque (MBT). For example, if $N_{ERROR}$ is positive, the control module 40 may retard the timing of the spark from MBT. By retarding the spark timing, combustion of the air/fuel mixture within the cylinder 18 is delayed and $N_{ACT}$ is reduced. Similarly, by advancing the spark timing, $N_{ACT}$ is increased. Changes in the spark timing from MBT also results in less efficient engine operation. Therefore, adjusting $N_{ACT}$ using DSC is generally limited to situations including, but not limited to, fine tuning, perturbations from engine loading (e.g., turning compressor on/off), adjusting alternator duty cycle and the like.

In operation, the control module 40 may include one or more limits for one or more of the idle control mechanisms described herein. For instance, adjustment of $N_{ACT}$ can be solely achieved by adjusting the throttle 16 when $N_{ERROR}$ is to be reduced in large RPM increments (e.g., >100 RPM). The increments are a function of the capability of the throttle 16 and the associated control mechanism, such as the aforementioned stepper motor. Once the control module 40 has adjusted $N_{ERROR}$ to less than the large RPM increment, the control module 40 may adjust the intake valve 22 and/or the exhaust valve 28 to further reduce $N_{ERROR}$ until reaching zero or until $N_{ERROR}$ is within a smaller range of $N_{TARGET}$ (e.g., 1 to 20 RPM). Similarly, DSC can be implemented to further reduce $N_{ERROR}$ until reaching zero or until $N_{ERROR}$ is within the smaller range of $N_{TARGET}$.

Figure 2:
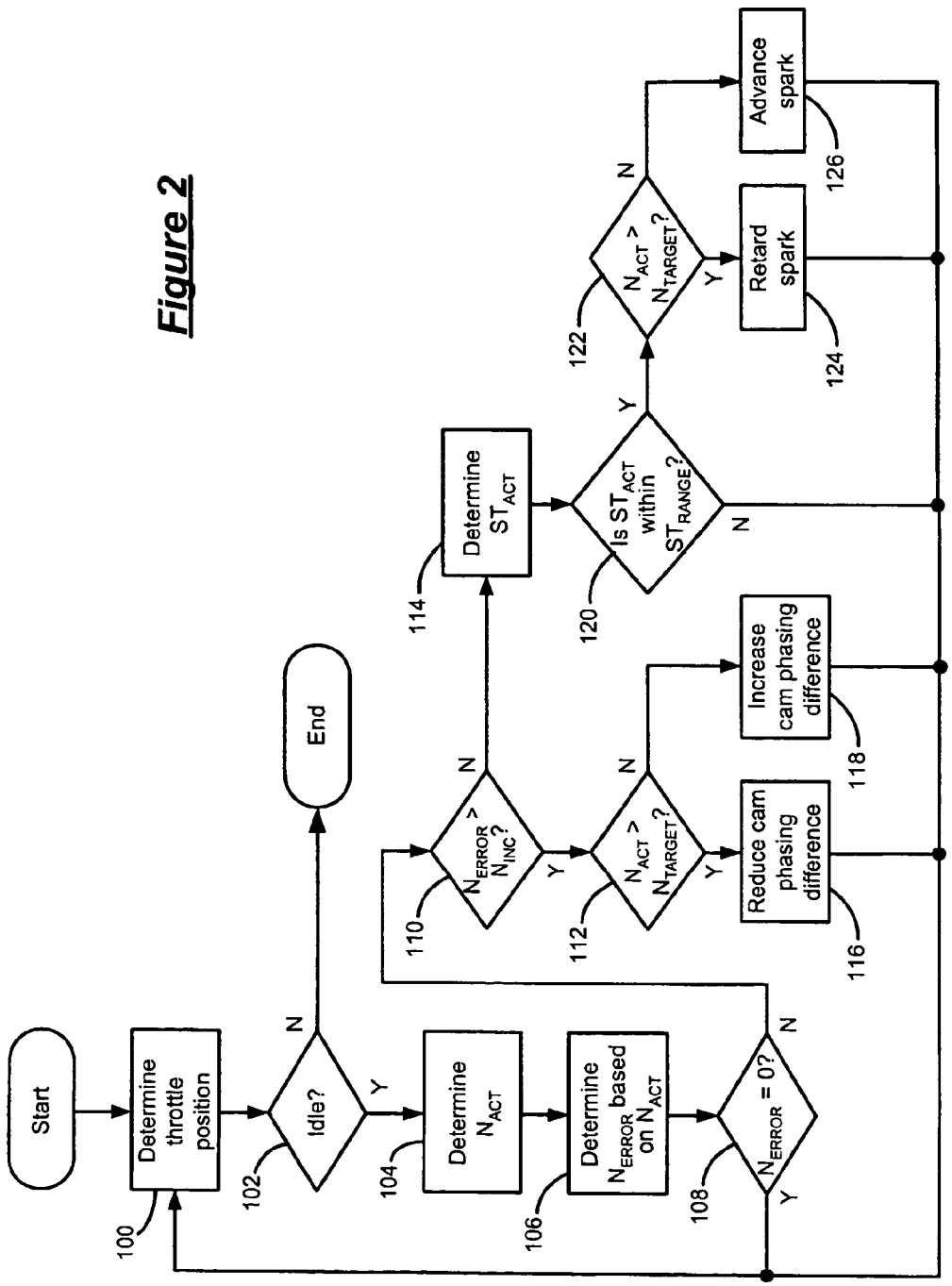
FIG. 2 is a flow chart illustrating steps executed by the engine idle control system of the present invention.

Referring now to FIG. 2, steps executed by the engine idle control system are illustrated. The throttle position is determined in step 100. In step 102, control determines whether the engine 12 is at idle based on the throttle position. If the engine 12 is not at idle, control ends. If the engine 12 is at idle, control determines $N_{ACT}$ in step 104. In step 106, control determines $N_{ERROR}$ based on $N_{ACT}$ and $N_{TARGET}$. In step 108, control determines whether $N_{ERROR}$ is equal to zero. If $N_{ERROR}$ is equal to zero, control loops back to step 100. If $N_{ERROR}$ is not equal to zero, control continues in step 110.

In step 110, control determines whether $N_{ERROR}$ is greater than an increment ($N_{INC}$) to determine which adjustment strategy is to be implemented to achieve $N_{ERROR}=0$. If $N_{ERROR}$ is greater than $N_{INC}$, control continues in step 112. If $N_{ERROR}$ is not greater than $N_{INC}$, control continues in step 114. In step 112, control determines whether $N_{ACT}$ is greater than $N_{TARGET}$. If $N_{ACT}$ is greater than $N_{TARGET}$, $N_{ERROR}$ is positive and control continues in step 116. If $N_{ACT}$ is not greater than $N_{TARGET}$, $N_{ERROR}$ is negative and control continues in step 118. In step 116, control reduces the cam phase difference of the intake and exhaust cam phase timing and control loops back to step 100. In step 118, control increases the cam phase difference of the intake and exhaust cam phase timing and control loops back to step 100.

In step 114, control determines the actual spark timing ($ST_{ACT}$). In step 120, control determines whether $ST_{ACT}$ is within a desired range ($ST_{RANGE}$). If $ST_{ACT}$ is not within $ST_{RANGE}$, spark timing cannot be used to adjust $N_{ERROR}$ and control loops back to step 100. If $ST_{ACT}$ is within $ST_{RANGE}$, spark timing can be used to adjust $N_{ERROR}$ and control continues in step 122. In step 122, control determines whether $N_{ACT}$ is greater than $N_{TARGET}$. If $N_{ACT}$ is greater than $N_{TARGET}$, $N_{ERROR}$ is positive and control continues in step 114. If $N_{ACT}$ is not greater than $N_{TARGET}$, $N_{ERROR}$ is negative and control continues in step 126. In step 124, control retards spark and loops back to step 100. In step 126, control advances spark and loops back to step 100.

The engine control system of FIG. 2 is described above as implementing cam phase control for controlling engine idle speed when a larger idle speed error is present and DSC for controlling engine idle speed when a smaller idle speed error is present. However, it is within the scope of the present invention to control the engine idle speed solely using cam phase control. It is further within the scope of the present invention to implement other idle speed control mechanisms in combination with cam phase control including, but not limited to throttle control, fuel control, turbocharger control and/or IAC valve control. While not individually described, one or more combinations of these idle speed control mechanisms and methods are embodiments of the present invention.

Those skilled in the art can now appreciate from the foregoing description that the broad teachings of the present invention can be implemented in a variety of forms. Therefore, while this invention has been described in connection with particular examples thereof, the true scope of the invention should not be so limited because other modifications will become apparent to the skilled practitioner upon a study of the drawings, specification, and the following claims.

What is claimed is:

1. An internal combustion engine idle speed control system, comprising:
a first engine idle speed control mechanism comprising a first valve control mechanism that adjusts a first operating parameter of a first cylinder valve;
a second engine idle speed control mechanism; and
a control module that determines an idle speed error, that generates a first control signal to said first valve control mechanism to adjust said first operating parameter to reduce said idle speed error when an idle speed adjustment increment is less than a first value and that generates a second control signal to said second engine idle speed control mechanism to reduce said idle speed error when said idle speed adjustment increment is less than a second value.

2. The system of claim 1 wherein said first cylinder valve is an intake valve.

3. The system of claim 1 wherein said first valve control mechanism is a cam shaft phaser that adjusts a timing of said first cylinder valve.

4. The system of claim 3 wherein said cam shaft phaser advances said timing to reduce said idle speed error.

5. The system of claim 3 wherein said cam shaft phaser retards said timing to reduce said idle speed error.

6. The system of claim 1 wherein said first valve control mechanism adjusts a lift of said first cylinder valve to reduce said idle speed error.

7. The system of claim 1 wherein the first engine idle speed control mechanism further comprises a second valve control mechanism that adjusts a second operating parameter of a second cylinder valve, wherein said control module generates a second control signal to said second valve control mechanism to adjust said second operating parameter to reduce said idle speed error when said idle speed adjustment increment is less than said first value.

8. The system of claim 7 wherein said second cylinder valve is an exhaust valve.

9. The system of claim 7 wherein said second valve control mechanism is a cam shaft phaser that adjusts a timing of said second cylinder valve.

10. The system of claim 9 wherein said cam shaft phaser advances said timing to reduce said idle speed error.

11. The system of claim 9 wherein said cam shaft phaser retards said timing to reduce said idle speed error.

12. The system of claim 7 wherein said second valve control mechanism adjusts a lift of said second cylinder valve to reduce said idle speed error.

13. The system of claim 1 wherein said control module determines said idle speed error as a difference between a target idle speed and an actual idle speed.

14. The system of claim 1 further comprising a spark plug, wherein said second engine idle speed control mechanism is a dynamic spark control that adjusts a spark timing of said spark plug to reduce said idle speed error.

15. The system of claim 1 further comprising a throttle, wherein said control module adjusts a position of said throttle to reduce said idle speed error when said idle speed adjustment increment is greater than said first value.

16. A method for controlling an idle speed of an internal combustion engine, comprising:

measuring an actual idle speed of said engine;

determining an idle speed error based on said actual idle speed;

controlling at least one valve of an intake valve and an exhaust valve to reduce said idle speed error when an idle speed adjustment increment is less than a first value; and regulating an idle speed control mechanism to reduce said idle speed error when said idle speed adjustment increment is less than a second value.

17. The method of claim 16 wherein said idle speed error is a difference between a target idle speed and said actual idle speed.

18. The method of claim 16 wherein said step of controlling a valve adjusts an amount of air ingested into a cylinder of said engine based on said idle speed error.

19. The method of claim 16 wherein said step of controlling a valve comprises adjusting a timing of said valve.

20. The method of claim 19 wherein said step of adjusting a timing comprises advancing said timing of said valve.

21. The method of claim 19 wherein said step of adjusting a timing comprises retarding said timing of said valve.

22. The method of claim 16 wherein said step of controlling a valve comprises adjusting a lift position of said valve.

23. The method of claim 16 wherein said step of regulating an idle speed control mechanism comprises adjusting a spark timing of a spark plug based on said idle speed error.

24. The method of claim 16 further comprising regulating a throttle valve to reduce said idle speed error when said idle speed adjustment increment is greater than said first value.

* * * * *